I (12) United States Patent
Ensley et al.

(10) Patent No.: US 9,629,373 B2
(45) Date of Patent: Apr. 25, 2017

(54) METHOD FOR SLICING TENDER

(71) Applicant: MAS Marketing Holding Company LLC, Dawsonville, GA (US)

(72) Inventors: Mike Ensley, Epworth, GA (US);
Andres Garcia, Gainesville, GA (US);
Gordon Tatro, Gainesville, GA (US);
Michael Sheets, Dawsonville, GA (US);
Mark Sosebee, Gainesville, GA (US)

(73) Assignee: MAS Marketing Holding Company, LLC, Dawsonville, GA (US)

( * ) Notice: Subject to any disclaimer, the term of this patent is extended or adjusted under 35 U.S.C. 154(b) by 515 days.

(21) Appl. No.: 13/782,322

(22) Filed: Mar. 1, 2013

(65) Prior Publication Data

US 2014/0154964 A1 Jun. 5, 2014

Related U.S. Application Data

(60) Provisional application No. 61/662,564, filed on Jun. 21, 2012.

(51) Int. Cl.
*A22C 18/00* (2006.01)
*A22C 21/00* (2006.01)
*A22C 17/00* (2006.01)

(52) U.S. Cl.
CPC ........ *A22C 21/003* (2013.01); *A22C 17/0033* (2013.01); *A22C 21/00* (2013.01)

(58) Field of Classification Search
CPC .... A22C 17/00; A22C 17/002; A22C 17/0033
USPC ................. 452/135, 149, 155, 160
See application file for complete search history.

(56) References Cited

U.S. PATENT DOCUMENTS

| | | | | |
|---|---|---|---|---|
| 5,273,483 A | * | 12/1993 | Gagliardi, Jr. | ........ A23L 1/3155 426/644 |
| 5,932,278 A | * | 8/1999 | Gagliardi, Jr. | .......... A23L 1/315 426/518 |
| 5,951,392 A | * | 9/1999 | Gagliardi | ........... A22C 17/0006 452/125 |
| 6,238,281 B1 | * | 5/2001 | Gagliardi, Jr. | ....... A22C 21/003 452/135 |
| 6,688,961 B2 | * | 2/2004 | Smith | .................. A22C 17/002 452/160 |
| 6,921,326 B2 | * | 7/2005 | Smith | .................. A22C 17/002 452/160 |
| 7,008,313 B2 | * | 3/2006 | Gagliardi, Jr. | ..... A22C 21/0076 426/480 |
| 7,134,958 B2 | * | 11/2006 | Gagliardi, Jr. | ..... A22C 21/0023 452/149 |
| 7,857,687 B2 | * | 12/2010 | Gagliardi, Jr. | ..... A22C 17/0006 452/174 |
| 8,043,146 B2 | * | 10/2011 | Lobel | ................. A22C 17/0006 452/157 |

* cited by examiner

*Primary Examiner* — Richard Price, Jr.
(74) *Attorney, Agent, or Firm* — Smith, Gambrell & Russell

(57) ABSTRACT

A method of processing a jumbo tender of a meat tender or poultry breast into strips having a desired weight and thickness with minimal losses requires two diagonal cuts across and through the jumbo to yield three portions which are substantially the same in weight and thickness.

7 Claims, 4 Drawing Sheets

METHOD FOR SLICING TENDER

PRIORITY CLAIM

This application claims priority from U.S. Provisional Patent Application No. 61/662,564 filed on Jun. 21, 2012, which is relied upon and incorporated herein in its entirety by reference.

BACKGROUND OF THE INVENTION

The present invention relates to the field of food preparation and more particularly to the preparation of poultry strips or tenders. In greater particularity the present invention relates to a method of slicing tenders to achieve the maximum number of substantially equal sized tenders.

Food safety guidelines call for cooking poultry products to a safe minimum internal temperature of 165° F. (about 74° C.) and cooking most beef, pork and other red meats, other than organ meats, the a safe minimum internal temperature of 145° F. (about 63° C.) as measured using a food thermometer. Typically, such temperature measurements are taken at the thickest portion of the poultry or meat product. However, poultry products such as chicken or turkey breasts or tenders and beef or pork tenderloins can have irregular shapes which often vary in thickness. As referred to herein, tenders will encompass any meat products which have these irregular or tear drop shapes. The term tender may refer to a product which has not been sliced into smaller portions or the resulting smaller portions. The term jumbo or jumbo tender, as used herein, refers to a meat product that will be reduced in size as by slicing in accordance with the disclosed method.

As a result of the irregularities in shape, some portions of the poultry or meat may be over cooked while other portions may be undercooked resulting in a food product that is less palatable. Additionally, due to variations in thickness cooking times may be prolonged or extended in order to achieve the safe minimum internal cooking temperatures. Such prolonged cooking times may also result in a meat or poultry product having a less palatable texture or taste due to loss of moisture and/or degradation of the proteins.

Referring to FIG. 1 to 3, the prior art method of preparing tenders from poultry breast is depicted. In FIG. 2 the standard breast from FIG. 1 is laid on its flat side and the substantially uniform portion of the breast is removed by starting the incision just below the thickest part of the breast. The uniform portion is then split into two substantially uniform tenders weighing between 22 and 31 grams per the industry standard. Conventionally, thickness has always been considered measuring vertically through the thickest portion of a tenderloin placed on a flat surface with the membrane side either facing down or up.

SUMMARY OF THE PRESENT INVENTION

It is an object of the present invention to facilitate the processing of meat and poultry products into strips or tenders that are uniform in thickness. The forgoing object of the invention furthers yet another of object of the invention which is to insure the proper cooking of tenders on the basis of the time the tenders are cooked. The aforesaid objects facilitate the further object of avoiding sickness from undercooked poultry. Yet another object of the invention is to reduce the amount of waste meat and poultry created with traditional methods of processing the breast meat.

These and other objects and advantages of the invention will become apparent from the following detailed description of the preferred embodiment of the invention.

BRIEF DESCRIPTION OF THE DRAWINGS

The method for processing tenders is depicted in the accompanying drawings which form a portion of this disclosure and wherein.

DESCRIPTION OF THE PREFERRED EMBODIMENT

Referring to the FIGS. 5-8 for a clearer understanding of the invention, it may be seen that the preferred embodiment of the invention contemplates a method for slicing meat tenders or poultry breasts into to strips or tenders having a substantially uniform thickness and weight. It is to be understood that thickness of a resulting tender is always measured on the thickest point, as the tender is lying flat with the longest dimension as the length, the second largest dimension as the width, and the smallest dimension as the thickness. The commercial specifications for sliced chicken tenders require that they have a maximum thickness of 0.60 inches=/−0.4.

Figure 5:
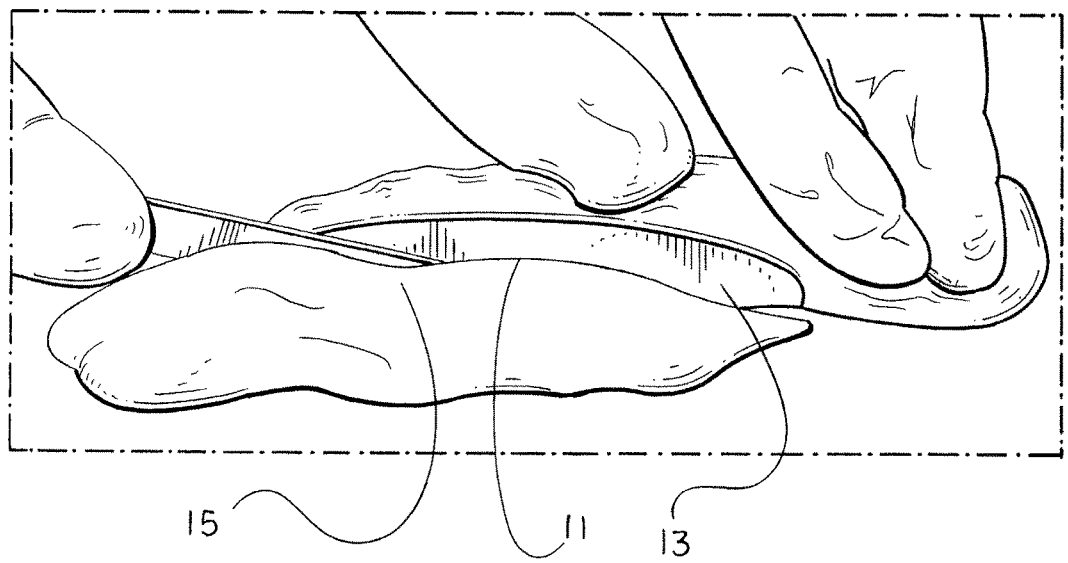
FIG. 5 is a perspective drawing of the initial cut of the new method.
Figure 6:
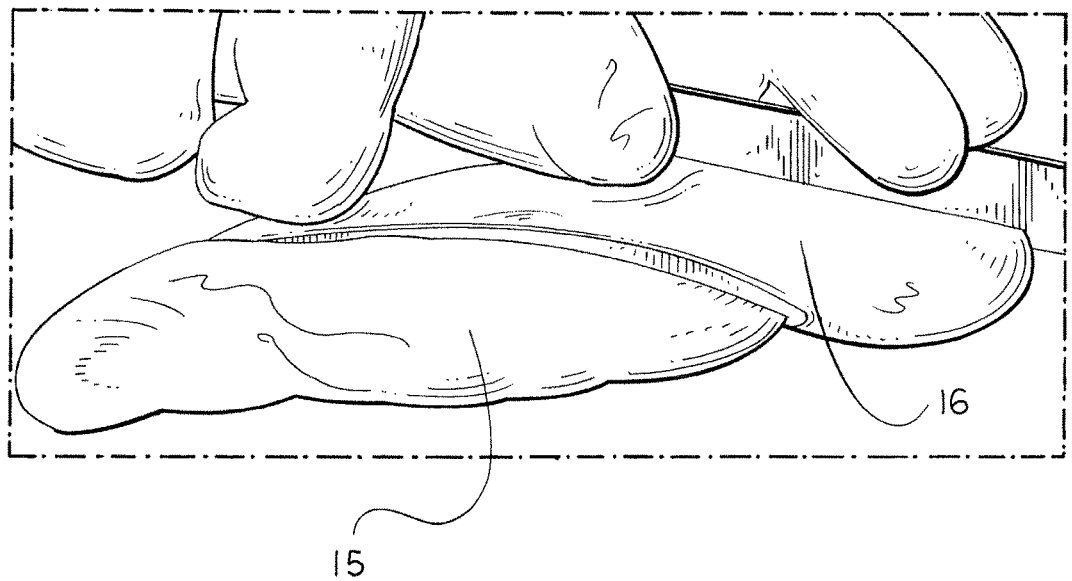
FIG. 6 is a perspective drawing of the second cut of the new method.
Figure 7:
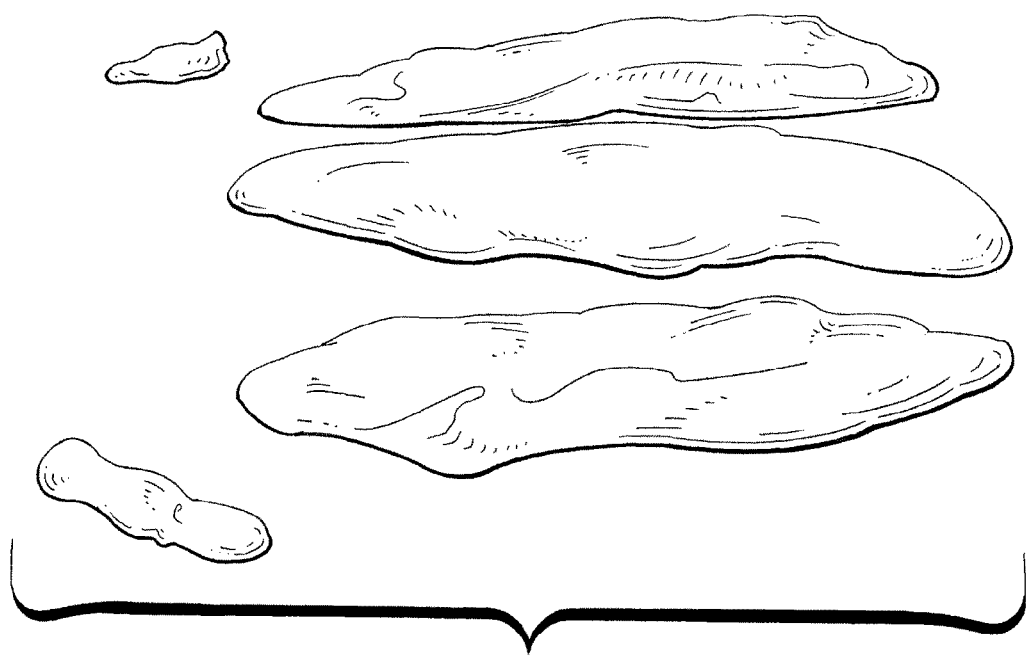
FIG. 7 is a perspective drawing of the three tenders and scrap cut by new method.
Figure 8:
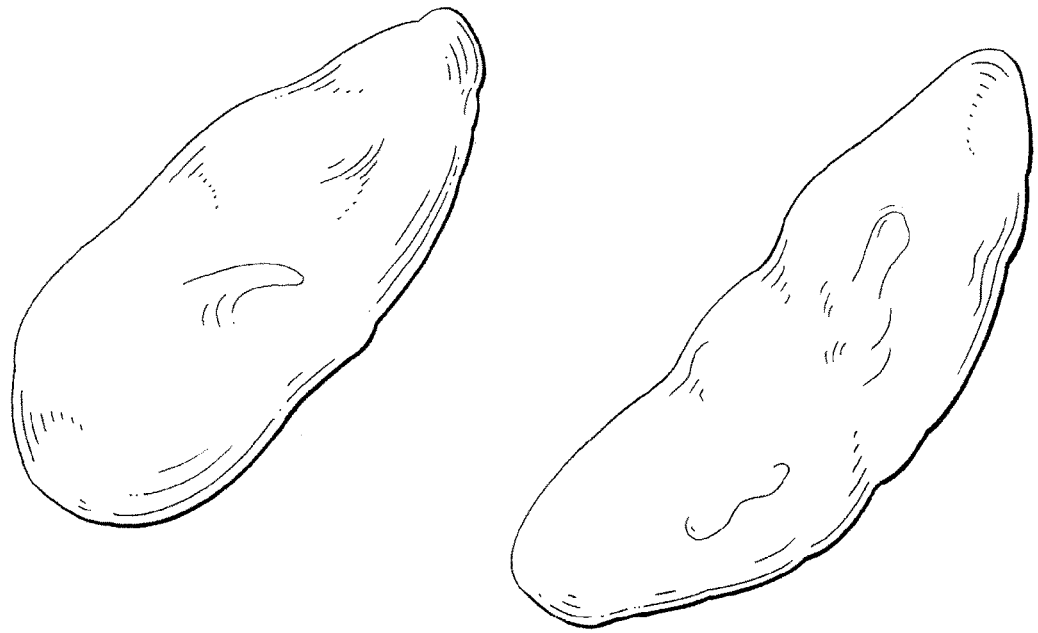
FIG. 8 is a photographic depiction of the two original breasts.

As you can see in FIG. 5, the jumbo chicken breast is laid as flat as possible on a supporting surface and a first cut 11 is begun on a side of the breast at a point 13 about two-thirds (⅔rds) of the length of the jumbo tender from the thinner end of the jumbo at a point just below the thickest part of the breast. The cut is made by slicing diagonally across the jumbo with the knife blade inclined from vertical about twenty degrees (20°). This cut creates the first tender 15, thus the beginning and end points of the cut need to be determined so as to remove a first tender or strip from the jumbo that falls within the specifications for commercial chicken tenders, namely that it have a thickness of between 0.30 to 0.60 inches and weigh between 20 and 27 grams. As shown in FIG. 6, the second cut begins substantially at the thickest end of the jumbo and is spaced from first cut a distance that defines the thickness of resulting tender 17. The knife is drawn along a line parallel to the first cut and the blade is angled to keep the thickness of the resulting tender about the same along the length of the cut. This cut creates the second tender and the third tender, however, the third tender may require some trimming to reduce it to optimum thickness.

Figure 1:
FIG. 1 is a perspective drawing of a chicken breast prepared for slicing into chicken tenders
Figure 2:
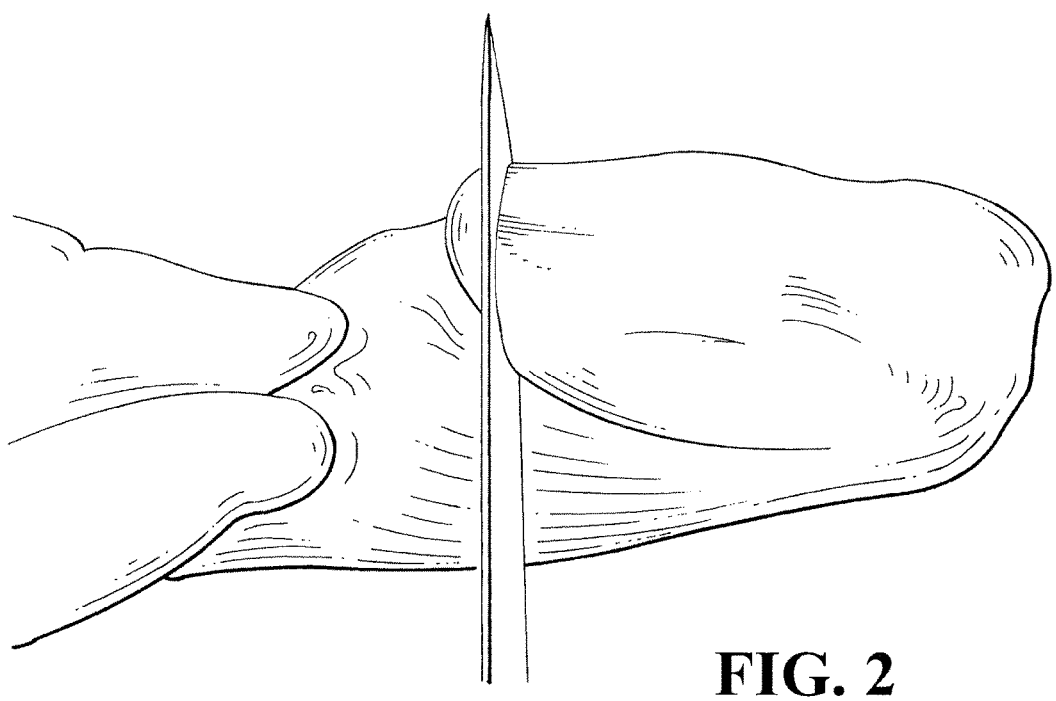
FIG. 2 is a perspective drawing of the initiation of the first cut in the prior art method.
Figure 3:
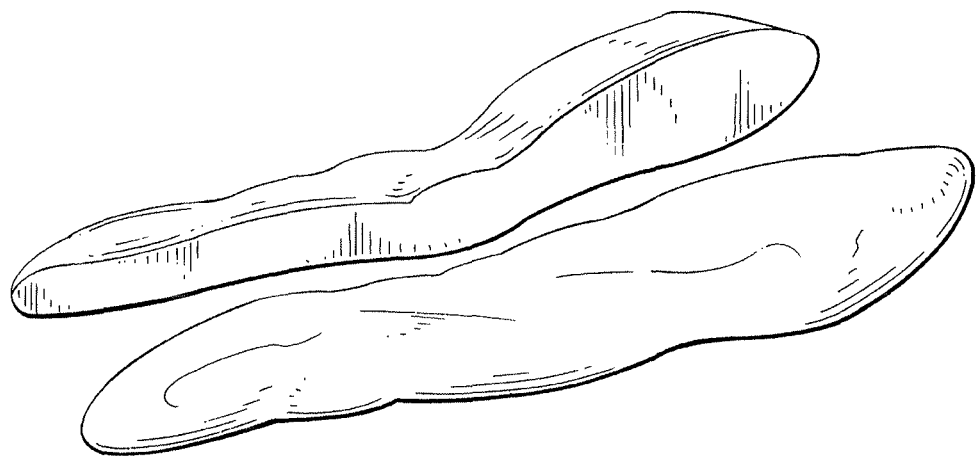
FIG. 3 is a perspective drawing of two chicken tenders as prepared in the prior art.
Figure 4:
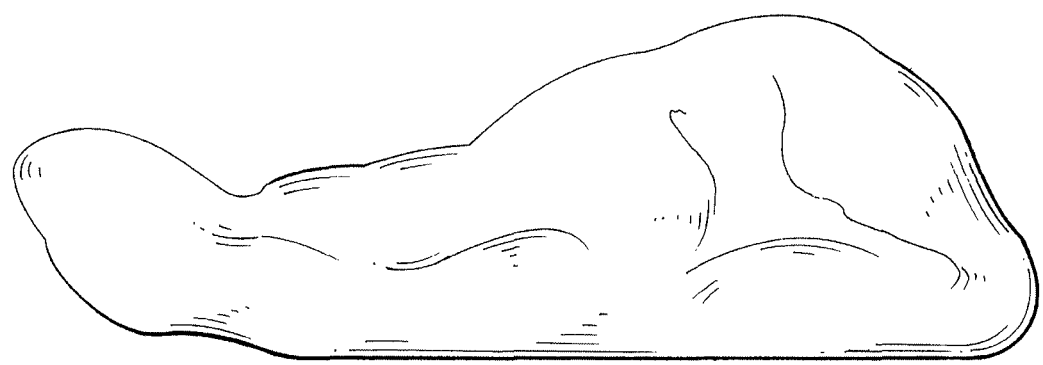
FIG. 4 is a perspective drawing of the scrap left by the prior art method.

The savings in waste of the new method is significant. The jumbo's used to create the tenders as shown in the prior art FIGS. 1 to 3 and in the present embodiment shown on FIGS. 5 to 7 each weighed about 82 grams when the cut was started. In the prior art, the cutting method resulted in two tenders each weighing between about 20 and 27 grams and yields a typical waste component that would range from 28 to 40 grams per jumbo. The present method yields three tenders weighing between 20 and 27 grams and yields a typical waste component of between less than 10 grams. It is to be understood that the form of the invention shown is a preferred embodiment thereof and that various changes and modifications may be made therein without departing from the spirit of the invention or scope as defined in the following claims.

What is claimed is:

1. A method for slicing a portion of an irregularly, tear drop shaped meat product into a group of strips, the irregular, tear drop shaped meat product having a flat side, a thickest part, a thinner end, and a length as a long dimension, the method comprising the steps of:
   a. placing the meat product on a cutting surface with the flat side of the meat product down against the cutting surface;
   b. making a first cut starting at a point about ⅔ of the length from the thinner end, the first cut progressing through the meat product toward the thinner end and along a first diagonal line, positioned diagonally with respect to the long dimension of the irregular, tear drop shaped meat product, the first diagonal line extending from the point about ⅔ of the length from the thinner end of the meat product so as to remove from the meat product a first strip of meat having the desired weight and of a substantially uniform thickness and leaving a remaining portion of the meat product that is larger than the first strip of meat;
   c. making a second cut through the remaining portion of the meat product along a second diagonal line, the second diagonal line positioned diagonally with respect to the long dimension of the irregular shaped meat product, beginning at substantially the thickest part of the remaining portion of the meat product, and extending substantially parallel to said first diagonal line, to yield a second strip of meat from the meat product, the second strip also having the weight and a substantially uniform thickness, and to yield a third strip of meat from the meat product having substantially the desired weight and a substantially uniform thickness.

2. A method for slicing a meat product as defined in claim 1 wherein the step of slicing along said first diagonal line yields a strip of meat having a substantially uniform thickness of between about 0.30 to about 0.60 inches.

3. A method for slicing a meat product as defined in claim 2 wherein the step of slicing along said first diagonal line yields a strip of meat having weight between about 20 and about 27 grams.

4. A method for slicing a meat product as defined in claim 2 wherein the meat product is a poultry breast.

5. A method for slicing a meat product as defined in claim 2 wherein the second diagonal line is spaced about 0.30 inches to about 0.60 inches from the first diagonal line.

6. A method for slicing a meat product as defined in claim 1 wherein the second diagonal line is spaced from the first diagonal line a distance substantially the same as the thickness of the strip of meat removed in the first slicing step.

7. A method for slicing a chicken tender weighing about 82 grams and having a flat side, a thickest part, a thinner end, an edge, and a length as a long dimension, the method comprising the steps of:
   a. placing the chicken tender on a cutting surface with the flat side of the meat product down against the cutting surface;
   b. making a first cut starting at a point positioned along the edge and about ⅔ of the length from the thinner end, the first cut extending through the meat product toward the thinner end and along a first diagonal line, the first diagonal line positioned diagonally with respect to the long dimension of the chicken tender and aligned so as to remove from the chicken tender a first strip of the chicken tender having a weight of between about 20 grams and 27 grams and having a substantially uniform thickness of between about 0.30 inch and 0.60 inch and leaving a remaining portion of the chicken tender that is larger than the first strip;
   c. making a second cut through the remaining portion of the chicken tender along a second diagonal line, the second diagonal line positioned diagonally with respect to the long dimension of the chicken tender, beginning at substantially the thickest part of the remaining portion of the chicken tender, and extending substantially parallel to said first diagonal line, and positioned with respect to the first diagonal line to yield a second strip from the remaining portion of the chicken tender, the second strip having a weight of between about 20 grams and 27 grams and having a substantially uniform thickness of between about 0.30 inch and 0.60 inch and leaving third strip of the chicken tender having a weight of between about 20 grams and 27 grams and having a substantially uniform thickness of between about 0.30 inch and 0.60 inch.

* * * * *